United States Patent
Chajdas et al.

(10) Patent No.: US 12,032,967 B2
(45) Date of Patent: Jul. 9, 2024

(54) PARTIAL SORTING FOR COHERENCY RECOVERY

(71) Applicant: Advanced Micro Devices, Inc., Santa Clara, CA (US)

(72) Inventors: Matthäus G. Chajdas, Munich (DE); Christopher J. Brennan, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/845,938

(22) Filed: Jun. 21, 2022

(65) Prior Publication Data
US 2023/0409337 A1     Dec. 21, 2023

(51) Int. Cl.
*G06F 9/38* (2018.01)
*G06F 9/30* (2018.01)
*G06F 9/48* (2006.01)
*G06F 9/50* (2006.01)

(52) U.S. Cl.
CPC .......... *G06F 9/3887* (2013.01); *G06F 9/3012* (2013.01); *G06F 9/4881* (2013.01); *G06F 9/5016* (2013.01)

(58) Field of Classification Search
CPC .... G06F 9/3887; G06F 9/3012; G06F 9/4881; G06F 9/5016; G06F 9/30018; G06F 9/30036; G06F 9/30038; G06F 9/30072; G06F 9/3851; G06F 9/38885; G06F 9/3888
See application file for complete search history.

(56) References Cited

U.S. PATENT DOCUMENTS

| | | | | |
|---|---|---|---|---|
| 8,417,833 | B1 * | 4/2013 | Amdahl | H04L 69/04 |
| | | | | 711/170 |
| 9,761,040 | B2 * | 9/2017 | Zimmerman | G06T 1/20 |
| 11,087,522 | B1 * | 8/2021 | Surti | G06T 15/06 |
| 2008/0077793 | A1 * | 3/2008 | Tan | G06F 21/56 |
| | | | | 713/168 |
| 2016/0306561 | A1 * | 10/2016 | Huang | G06F 3/0679 |
| 2017/0178398 | A1 * | 6/2017 | Afra | G06T 15/80 |

* cited by examiner

*Primary Examiner* — Farley Abad
(74) *Attorney, Agent, or Firm* — Volpe Koenig (57) ABSTRACT

Devices and methods for partial sorting for coherence recovery are provided. The partial sorting is efficiently executed by utilizing existing hardware along the memory path (e.g., memory local to the compute unit). The devices include an accelerated processing device which comprises memory and a processor. The processor is, for example, a compute unit of a GPU which comprises a plurality of SIMD units and is configured to determine, for data entries each comprising a plurality of bits, a number of occurrences of different types of the data entries by storing the number of occurrences in one or more portions of the memory local to the processor, sort the data entries based on the determined number of occurrences stored in the one or more portions of the memory local to the processor and execute the sorted data entries.

18 Claims, 5 Drawing Sheets

| 4-BIT DATA ENTRIES | HASHED VALUES | HASHED SET OF BITS (FIRST 2 BITS) |
|---|---|---|
| 0000 (ENTRY A) | 1101 | 11 |
| 0001 (ENTRY B) | 0110 | 01 |
| 0010 (ENTRY C) | 1101 | 11 |

| | POSSIBLE DATA TYPES | COUNT |
|---|---|---|
| Prefix Sum 0 | 00 | 0 |
| 0 | 01 | 1 |
| 1 | 10 | 0 |
| 3 | 11 | 2 |

| SORTED ENTRIES | | | |
|---|---|---|---|
| ENTRY B | ENTRY A | ENTRY C | |

Offset  0x0    0x1      0x2      0x3

506

PARTIAL SORTING FOR COHERENCY RECOVERY

BACKGROUND

Conventional computer architectures include processing devices with multiple processors configured to process sequences of programmed instructions. The processors can be used to process tasks of a program in parallel with other tasks. During processing, amounts of parallel work (e.g., number of parallel tasks, amount of time to process parallel tasks, number of cycles to process parallel tasks) can vary over different portions or phases of the program. Processing delays, (e.g., delays in execution of a program) of one or more of these tasks can delay the execution of the program, negatively impacting performance.

BRIEF DESCRIPTION OF THE DRAWINGS

A more detailed understanding may be had from the following description, given by way of example in conjunction with the accompanying drawings wherein.

DETAILED DESCRIPTION

Data is executed, by a processor (e.g., parallel processing units, such as single-instruction-multiple-data (SIMD) units of a GPU), as blocks of data in an order (i.e., program order) in which the data is stored (e.g., in a buffer). In addition, the parallel processing units execute data of a same type (e.g., a same value) at one time (e.g., in a single clock cycle).

For example, for 8 data entries comprising 3 different data types (i.e., data type A, data type B and data type C) and stored as AAABBACA, the data is executed on a first 4-wide SIMD unit over 2 cycles (i.e., AAA in a first cycle and B in a second cycle) and on a second 4-wide SIMD unit over 3 cycles (B in a first cycle, AA in a second cycle, and C in a third cycle). That is, assuming execution of each data type of an iteration takes one clock cycle, the 8 data entries are inefficiently executed in 5 cycles.

Conventional techniques attempt to reduce this inefficiency (e.g., reduce the number of cycles to execute the data) by sorting the data to recover execution coherency. Execution coherency refers to a level of similarity of the data, in a block of data, to be executed by a parallel processing unit (e.g., a SIMD unit). For example, a block of 32 data items (to be executed on a 32-wide SIMD unit) having 27 data items of a first data type and 5 data items of a second data type is considered highly coherent. In contrast, a block of 32 data items, in which each data item is a different data type, is considered highly incoherent. Generally, data blocks are executed more efficiently (e.g., in less cycles) as the coherency of the data blocks increases.

Conventional sorting methods increase the coherency of the blocks of data to be executed by a processing unit (e.g., a SIMD unit) by fully sorting of the data (e.g., in the buffer) to be executed. For example, the 8 data entries AAABBACA in the example described above, can be fully sorted (assuming lexicographic ordering) as AAAAABBC. Accordingly, the data is executed on the first 4-wide SIMD unit over 1 cycle (i.e., AAAA in a first cycle) and on the second 4-wide SIMD unit over 3 cycles (A in the first cycle, BB in the second cycle, and C in the third cycle). That is, assuming execution of each data type takes one clock cycle, the 8 data entries are more efficiently executed in 4 cycles, instead of the 5 cycles as described above when the data is unsorted. While fully sorted data is executed more efficiently than unsorted, data, execution coherency can be more recovered more efficiently, by partially sorting data to be executed such that nearby data entries in the buffer are of the same data type.

Some conventional methods use software to partially sort the data to recover execution coherency. For example, specific programmed instructions are executed by the shader core to approximate the sorting. These conventional sorting methods are not efficient, however, because executing the additional instructions needed to partially sort the data typically consumes more time (e.g., cycles) than the time (e.g., cycles) that is saved by executing the sorted data.

Features of the present disclosure provide devices and methods for partially sorting data efficiently to recover coherency of the data executed on a processor (e.g., on parallel processing units, such as SIMD units of a GPU), Features described herein efficiently implement partial sorting of the data for non-coherent workloads by utilizing existing hardware along the memory path. For example, as described in more detail below, memory local to a compute unit (e.g., local data share (LDS) memory, L0 cache memory and register files) that is typically used to coalesce addresses, is utilized to efficiently perform the partial sorting. The memory local to the compute unit is used store bit values of data entries and the numbers of occurrences of each data entry during a counting and sorting (i.e., pa counting sort). The counting sort employs a lossy binning of the data and bit-pack instructions to provide an efficient sorting with low entropy. The partial sorting uses small amounts of memory (e.g., 2 bytes of overhead per sorted data item for a sort window of 256 items) and is, for example, mapped onto existing hardware (e.g., memory local to a compute unit processing the data) to efficiently recover coherency in divergent workloads.

In addition, the counting sort is executed more efficiently (e.g., less time and power consumption) using the existing hardware along the memory path (e.g., the memory local to the compute unit) than by executing the counting sort in software (e.g., executing the counting sort via programmed instructions executing on the shader core).

The counting sort is efficiently performed regardless of the amount of data to be sorted. Conventional techniques cannot efficiently execute data of non-coherent workloads (e.g., ray tracing workloads) on a wide SIMD unit because different code paths are executed by wavefronts of the workloads. Features of the present disclosure exploit the similarity of data across multiple wavefronts and increase the size of the sort window to recover coherency for data across multiple wavefronts.

A method of processing non-coherent data is provided which comprises determining, for data entries each comprising a plurality of bits, a number of occurrences of different types of the data entries by storing the number of occurrences in memory local to a compute unit, sorting the data entries based on the determined number of occurrences stored in the memory local to the compute unit and executing the sorted data entries.

An accelerated processing device is provided which comprises memory and a processor. The processor comprises a plurality of SIMD units and is configured to determine, for data entries each comprising a plurality of bits, a number of occurrences of different types of the data entries by storing the number of occurrences in one or more portions of the memory local to the processor, sort the data entries based on the determined number of occurrences stored in the one or more portions of the memory local to the processor and execute the sorted data entries.

A processing device is provided which comprises memory and an accelerated processing device. The accelerated processing device comprises a plurality of processors, each having plurality of SIMD units. Each processor is configured to determine, for data entries each comprising a plurality of bits, a number of occurrences of different types of the data entries by storing the number of occurrences in one or more portions of the memory local to the processor, sort the data entries based on the determined number of occurrences stored in the one or more portions of the memory local to the processor; and execute the sorted data entries.

Figure 1:
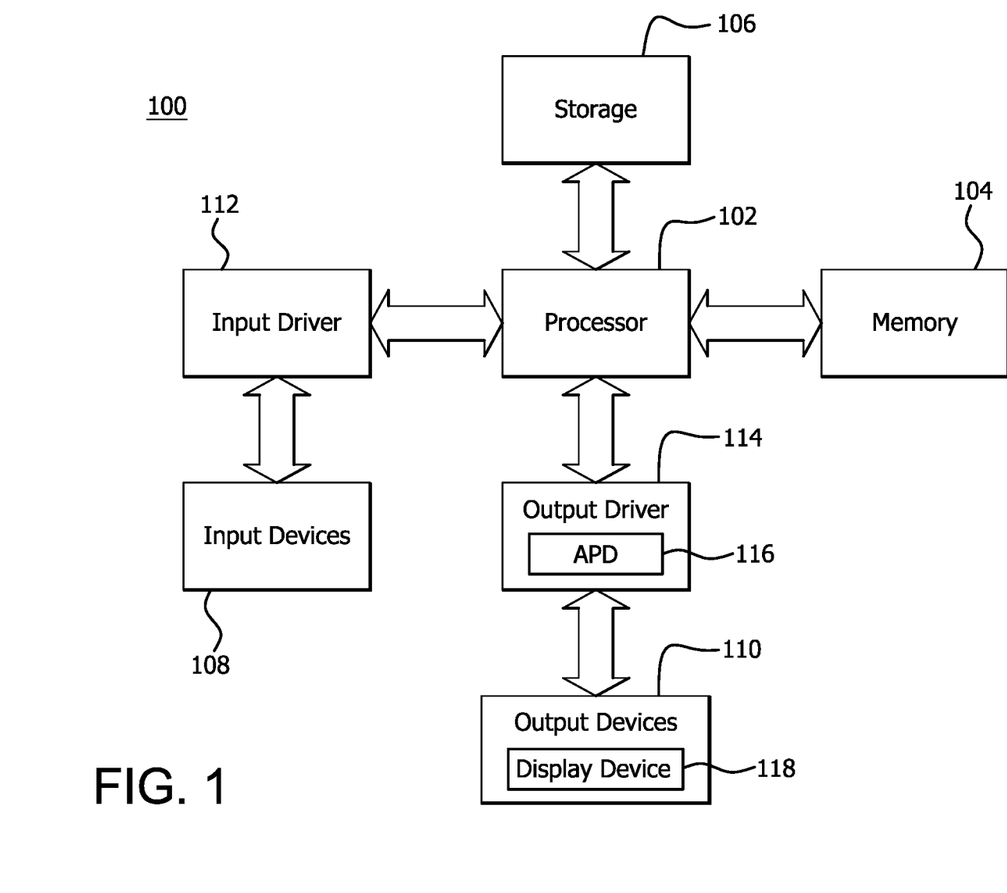
FIG. 1 is a block diagram of an example device in which one or more features of the disclosure can be implemented.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 includes additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display device 118, a display connector/interface (e.g., an HDMI or DisplayPort connector or interface for connecting to an HDMI or DisplayPort compliant device), a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide (graphical) output to a display device 118. For example, it is contemplated that any processing system that performs processing tasks in accordance with a SIMD paradigm can be configured to perform the functionality described herein. Alternatively, it is contemplated that computing systems that do not perform processing tasks in accordance with a SIMD paradigm performs the functionality described herein.

Figure 2:
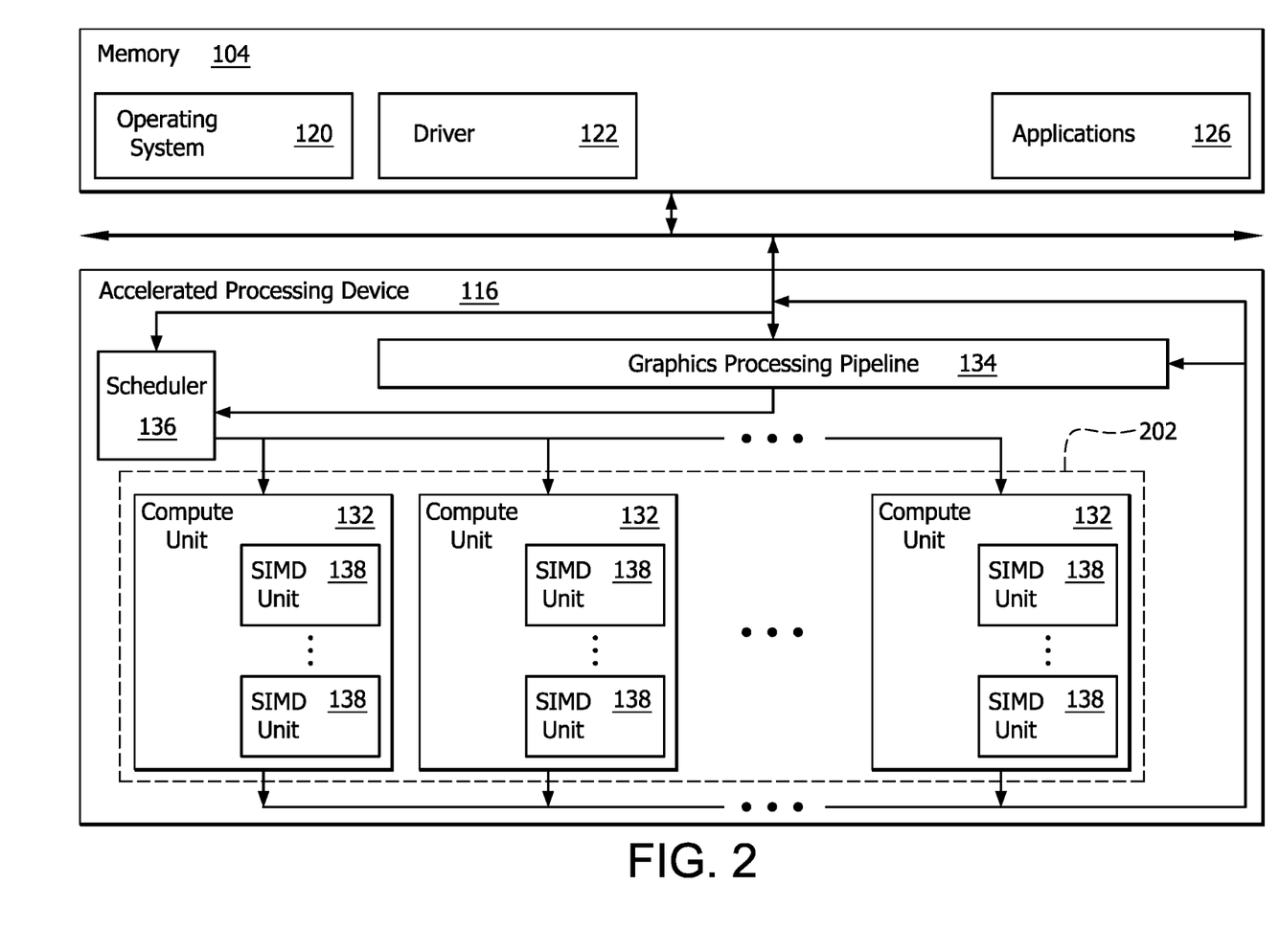
FIG. 2 is a block diagram of aspects of the example device in FIG. 1, illustrating additional details related to execution of processing tasks on the accelerated processing device in FIG. 1, according to an example.

FIG. 2 is a block diagram of aspects of device 100, illustrating additional details related to execution of processing tasks on the APD 116. The processor 102 maintains, in system memory 104, one or more control logic modules for execution by the processor 102. The control logic modules include an operating system 120, a driver 122, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. In some implementations, the driver 122 includes a just-in-time compiler that compiles programs for execution by processing components (such as the SIMD units 138 discussed in further detail below) of the APD 116. In other implementations, no just-in-time compiler is used to compile the programs, and a normal application compiler compiles shader programs for execution on the APD 116.

The APD 116 executes commands and programs for selected functions, such as graphics operations and non-graphics operations that are suited for parallel processing and/or non-ordered processing. The APD 116 is used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but executes that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. In an implementation, each of the compute units 132 can have a local L1 cache. In an implementation, multiple compute units 132 share a L2 cache.

The basic unit of execution in compute units 132 is a work-item. Each work-item represents a single instantiation of a program that is to be executed in parallel in a particular lane. Work-items can be executed simultaneously as a "wavefront" (also "waves") on a single SIMD processing unit 138. One or more wavefronts are included in a "work group," which includes a collection of work-items designated to execute the same program. A work group is executed by executing each of the wavefronts that make up the work group. In alternatives, the wavefronts are executed sequentially on a single SIMD unit 138 or partially or fully in parallel on different SIMD units 138. A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations and non-graphics operations (sometimes known as "compute" operations). Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
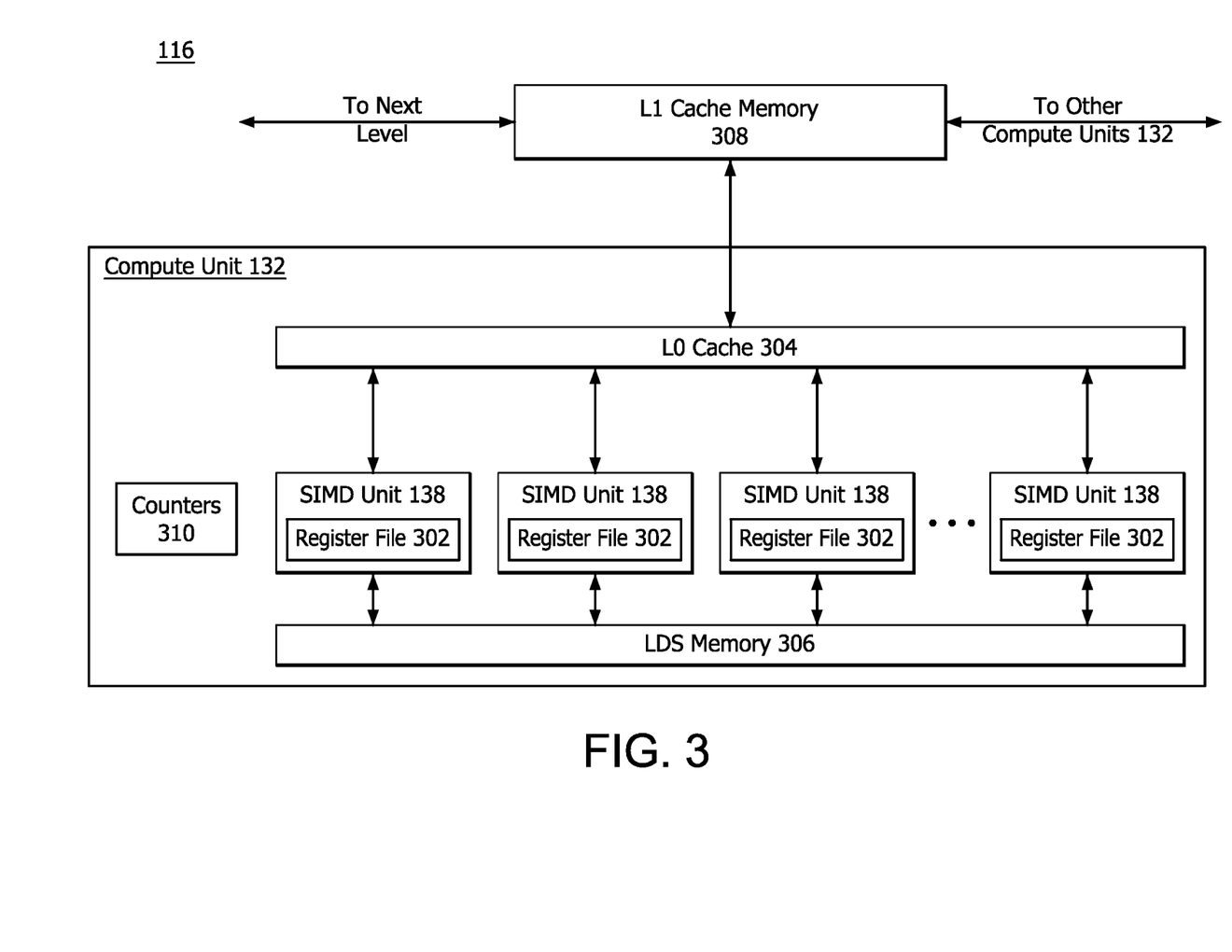
FIG. 3 is a block diagram illustrating example components of the APD shown in FIG. 2, including additional details of example components of a compute unit for implementing one or more features of the present disclosure.

FIG. 3 is a block diagram illustrating example components of the APD 116 (e.g., GPU) shown in FIG. 2, including additional details of example components of a compute unit 132 for implementing one or more features of the present disclosure.

As shown in FIG. 3, the compute unit 132 includes SIMD units 138. Each SIMD unit 138 includes a register file 302 (e.g., 128K storage capacity or 256 KB storage capacity). The register files 302 of each SIMD unit 138 are typically private to each SIMD unit 138 and are not shared by other SIMD units 138. SIMD units 138.

The compute unit 132 also includes a level 0 (L0) cache memory 304 (e.g., L0 vector cache) LDS memory 306. The register files 302, L0 cache memory 304 and LDS memory 306 are portions of memory local to the compute unit 132.

The LDS 306 memory is shared between the SIMD units 138 (e.g., shared between work-items in a workgroup) of the compute unit 132. That is, the LDS 306 is accessible by each of the SIMD units 138 and can share the data between the SIMD units 138. The LDS 306 a low-latency and high bandwidth explicitly addressed memory. While the LDS 306 memory is typically used for synchronizing within a workgroup, the LDS 306 memory is utilized to efficiently implement features of the present application (e.g., counting sort) as described in more detail below. The LDS 306 includes multiple memory arrays comprising banks (e.g., 64 KB arrays comprising 32 banks per array each configured to store 512 32-bit wide data entries).

Each SIMD unit 138 can push data to the LDS 306 and another SIMD unit 138 can pull data from the LDS memory 306. In contrast, the register files 302 of each SIMD unit 138 are typically private to each SIMD unit 138 and are not shared by other SIMD units 138. A SIMD unit 138 typically makes data available to another SIMD unit 138, by pushing the data to the LDS memory 306, the L0 cache memory 304, the L1 cache memory 306 or another portion of memory (e.g., next level cache or main memory to be accessible by the other SIMD unit 138.

The L0 cache memory 304 is also shared between the SIMD units 138 of the compute unit 132. The L0 cache memory 304 includes, for example, 16 KB storage capacity with 128-byte cache lines to deliver a wavefront for each cycle.

The APD 116 also includes an L1 cache memory 308. The L1 cache is shared across multiple compute units 132. As shown in FIG. 3, the L1 cache memory 308 is in communication with the L0 cache memory 304 of compute unit 132, other compute units 132 (e.g., L0 cache memory of other compute units 132 shown in FIG. 2) and higher levels of memory (e.g., L2 cache, L3 cache and main memory).

Partial sorting of the non-coherent data is efficiently performed by utilizing the existing hardware (e.g., local memory, such as register file 302, L0 cache memory 304 and LDS 306) along the memory path. For example, as described in more detail below, portions of the local memory (i.e., local to the compute unit 132) are used to store bits (i.e., bit values) identifying the different data types (e.g., different values) to be counted and sorted (i.e., perform a counting sort). Portions of the local memory are also used to store counts (i.e., the number of occurrences) of each data type. The counting sort is implemented, for example, using a parallel prefix sum or other know primitives used to facilitate the counting sort. The data is sorted, based on the stored counts of the data types and the sorted entries are mapped to and stored at N-bit offset addresses in the local memory, where N is the number of bits of each data entry type. The sorted entries are then provided to the SIMD units 138 for execution at the registers files 302 of the SIMD unit 138.

Figure 4:
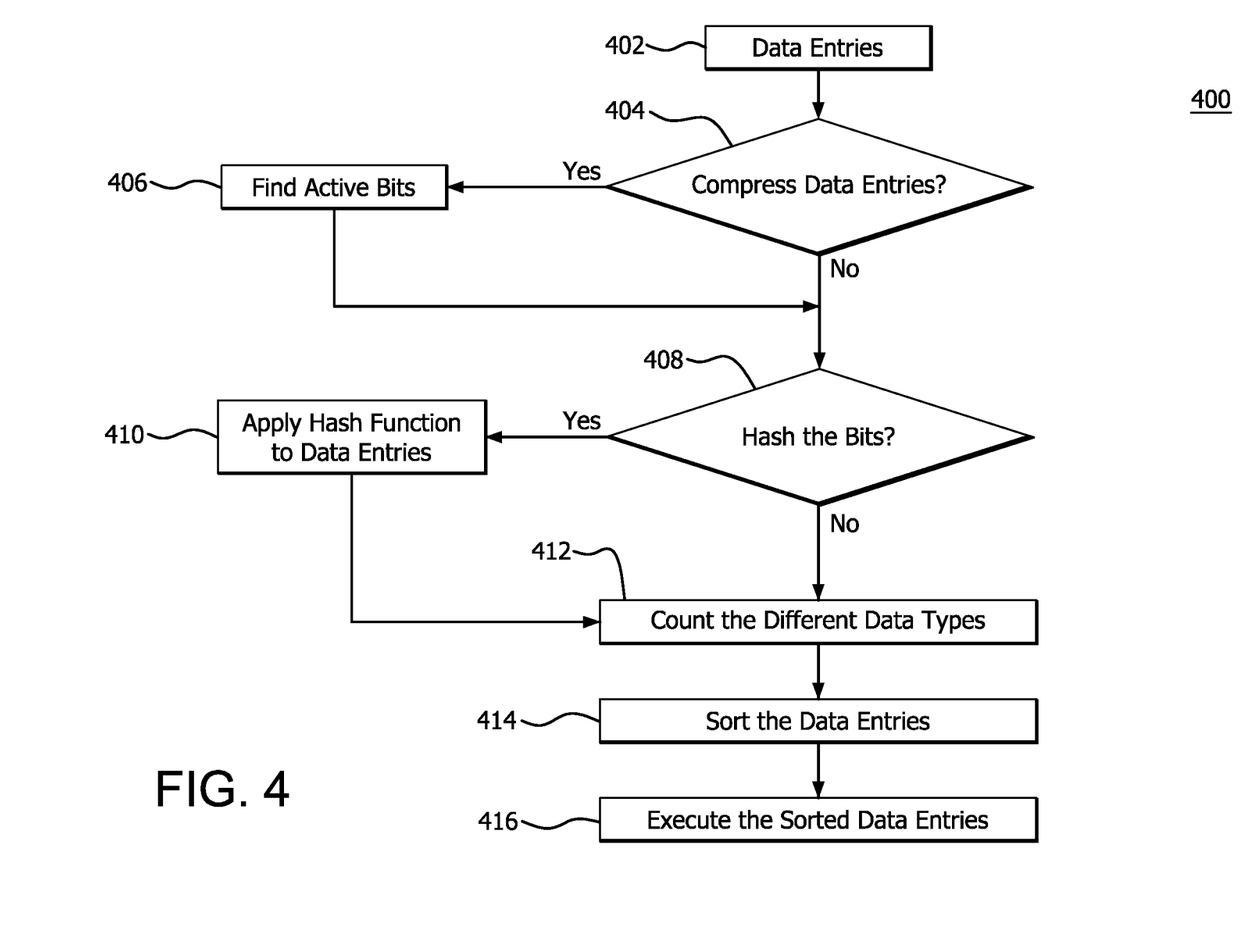
FIG. 4 is a flow diagram illustrating an example method of partial sorting for coherence recovery according to features of the present disclosure.

FIG. 4 is a flow diagram illustrating an example method 400 of partial sorting for coherency recovery. As shown at decision block 404 of FIG. 4, the method 400 includes determining (e.g., by the compute unit 132) whether or not to compress the data entries 402 (i.e., reduce the number of bits of the data entries 402) for counting and sorting.

The amount of memory allocated to perform a counting sort for a fixed number of data entries is directly correlated with the number of different possible data entry types to be counted and sorted and the size of the data entries (i.e., number of bits per entry). For example, the number of different data entry types (e.g., data values) is equal to $2^N$ (where N is the number of bits of each data entry type). Therefore, if the data entries are 4-bit entries, there are 16 (i.e. 24=16) different possible data entry types (i.e., 0000, 0001 . . . 1111) to be counted (i.e., the number of occurrences of each data entry type to be counted) and sorted. Accordingly, in this example, memory is dynamically allocated at run time to increment a 4-bit counter (i.e., 4 bits to match 4 counting bins), which uses 16 slots of memory.

In one implementation, memory is dynamically allocated to subsets of the counting bins to perform counting sorts for data entries of multiple concurrently executing programs. For example, for data entries (outputs) of two concurrently executing programs, the 4-bit counter (which uses 16 slots of memory) described above is divided into two separate 3-bit counters (each using 8 slots of memory). That is, 8 addressable portions (e.g., slots) of memory are dynamically allocated to perform the counting sort for one of the programs and another 8 addressable portions of memory are dynamically allocated to perform the counting sort for the data entries of the other program.

However, if the number of counting bins (e.g., 4 counting bins) is less than the number of different possible data types (e.g., 16 data types) to be counted, there is a high probability that collisions will occur during counting (i.e., that different data types will be assigned to the same counting bin), and the number of occurrences for one or more data types will be incorrectly determined.

Accordingly, the number of bits N of the data entries to be counted and sorted (i.e., used for counting sort) is determined based on the amount of memory allocated to perform the counting sort. For example, when the number of bits N of the data entries 402 is determined to be greater than the number of counting bins, the data entries 402 are determined, at decision block 404, to be compressed (YES decision) and the method proceeds to block 406.

As shown at block 406, the active bits (i.e., bits whose values change across the data entries) are determined from the bits of the data entries 402. The active bits typically represent a portion of the bits of the data entries (i.e., set of bits less than the total number of bits of the data entries). For example, for three 4-bit data entries having values of 0010, 0110 and 0100, the values of the first and fourth bits are zero for each of the entries (i.e., the values of the first and fourth bits do not change across the data entries), but the values of the second and third bits do change across the data entries. Therefore, the second and third bits are determined as the active bits to be used for counting sort. Because the values of the first and fourth bits do not change across the data entries, these bits cannot be used to distinguish between the different data entries. If the first and fourth bits were used, the values of the data entries output from the mask will be determined to be the same as the input values (e.g., all zeroes) and the sorting will result in each of the data entries being assigned to the same counting bin, resulting in incorrect sorting. Accordingly, by eliminating these bits from the counting sort, the data entries are more efficiently identified and distinguished from each other with less bits.

The active bits are determined, for example, by using a bit packing mask such that bits which do not change are masked off while the set of bits which do change across each data entry (i.e., the active bits) are used to identify the data entries as corresponding data types (e.g., data entries having the same values) and used for the counting sort. The values of each identified data type are assigned to a different counting bin (e.g., addressable portion of memory) for counting the number of occurrences of each data type. The number of occurrences of each data type is tracked by changing the count (e.g., incrementing a counter or decrementing the counter) for the corresponding data type.

Alternatively, the set of bits extracted and used for the counting sort is, for example, determined as a consecutive set of bits of significance (e.g., set of most significant bits, set of least significant bits or another set of bits of significance).

When the number of bits N of the data entries 402 is determined to be equal to or less than the number of counting bins, the data entries 402 are determined, at decision block 404, not to be compressed (NO decision) and the method proceeds to block 408.

As shown at decision block 408, the method 400 includes determining whether or not to hash bits for the counting sort. That is, it is determined whether or not to hash the active bits (determined at block 406) or whether or not to hash each of the bits of the uncompressed data entries (determined at block 404).

For example, when the number of active bits N (determined at block 406) is still greater than the number of counting bins, it is determined at block 408 to hash the active bits to further reduce the number of bits to be counted and sorted. Accordingly, a hash function is applied to the data entries at block 410. However, when the number of active bits N (determined at block 406) is less than the number of counting bins, it is determined at block 408 to not hash the active bits and instead use the active bits for counting at block 412 and sorting at block 414.

Additionally or alternatively, the determination of whether or not to hash the active bits is based on a probability of a number of collisions occurring during the counting sort (i.e., a probability that a number different data types will be assigned to the same counting bin) due to a high number of different data entries having the same active bit values.

For example, the number of different data entries having the same bit values is compared to a threshold number of same bit values (or threshold percentage of same bit values). When the number of different data entries having the same bit values is less than the threshold number of same bit values, a determination is made at block 408 to not hash the active bits. However, when the number of different data entries having the same bit values is equal to or greater than the threshold number of same bit values, a determination is made at block 408 to hash the active bits.

In addition, the data entries can be hashed any number of times (e.g., a single time or multiple times). For example, after the active bits are hashed, the process (at blocks 408 and 410) repeats by comparing the number of hashed entries having the same bit values to the threshold number of number of same bit values. The process (at blocks 408 and 410) can be repeated a predetermined number of times or until the number of different data entries having the same bit values is less than the threshold number of same bit values.

When the bits of the data entries are not compressed (i.e., the number of bits N of the data entries 402 is determined to be equal to or less than the number of counting bins), the determination of whether or not to use a hash function is based on based on the probability of a number of collisions occurring during the counting sort, as described above.

For example, when the data entries 402 are determined not to be compressed at block 404, a hash function is applied to the uncompressed data entries 402 (to change the values of the bits and reduce the probability of collisions). That is, applying the hash function to the data entries facilitates a more efficient distribution for counting the occurrences of the different data types. That is, to store bits of data representing the number of occurrences of each data type (i.e., counts) and to sort the data entries, based on the number of occurrences, at N-bit offset addresses in the local memory, where N is the number of bits of each data entry type. The counting sort is implemented, for example, using a parallel prefix sum or other know primitives used to facilitate a counting sort. The sorted entries are then provided to the SIMD units 138 for execution at the registers files 302 of the SIMD unit 138.

Figure 5A:
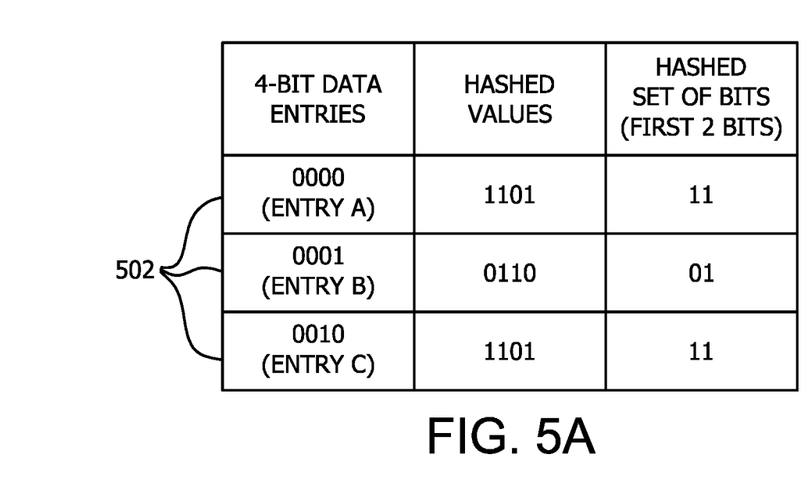
FIG. 5A is a table showing 4-bit data entries, hashed values of the 4-bit data entries and hashed values of the set of 2 bits used for counting, according to an example.
Figure 5B:
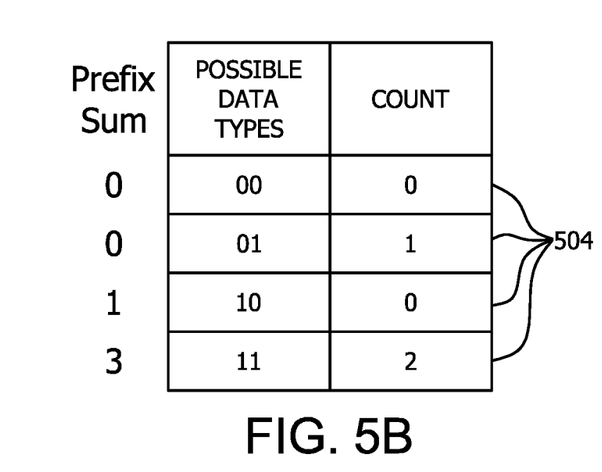
FIG. 5B is a table showing the data types for the hashed values of the set of 2 bits shown in FIG. 5A and the count of each data type.
Figure 5C:
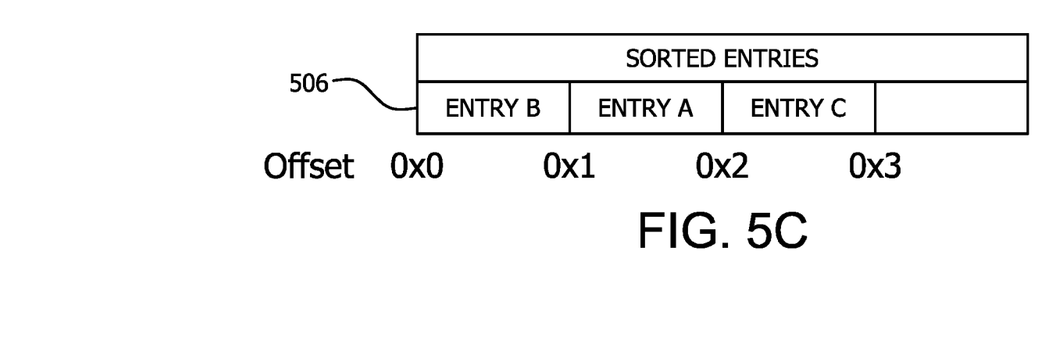
FIG. 5C is a table showing the sorted data entries based on the count shown in FIG. 5B.

FIGS. 5A-5C are tables used to illustrate an example of implementing the method 400 including applying a hash function to reduce the probability of collisions occurring during the counting sort. For simplified explanation, in the example illustrated in FIGS. 5A-5C, the first 2 bits of 4-bit data entries are determined as the set of bits used for counting the occurrences of different data types of 3 data entries having values of 0000, 0001 and 0010.

FIG. 5A is a table showing the 4-bit data entries (Entry A, Entry B and Entry C), the hashed values of the 4-bit data entries and the hashed values of the set of 2 bits used for counting. FIG. 5B is a table showing the 4 possible data types (values) for the hashed values of the set of 2 bits shown in FIG. 5A and the count (i.e., number of occurrences) of each data type. FIG. 5C is a table showing the sorted data entries based on the count shown in FIG. 5B.

The example illustrated in FIGS. 5A-5C uses three 4-bit data entries merely for simplified explanation. Features of the present disclosure can be implemented for any number of data entries of any bit size. In addition, for simplified explanation purposes, the example illustrated in FIGS. 5A-5C includes 2 bits as the set of bits used to identify the data entries as data types and 4 counter bins to track the number of occurrences of 4 different possible data types for 2 bits sets. Features of the present disclosure can be implemented for other bit set sizes (e.g., 4-bit sets, 8-bit sets, 16-bit sets or any bit set size) as well as other numbers of counter bins used to track the number of occurrences of the data types based on the determined bit set size used to identify the data entries.

As shown in FIG. 5A, the 4-bit data entries are stored at local memory portion 502. Entry A is stored at a first address of the local memory portion 502, Entry B is stored at a second address of local memory portion 502 and Entry C is stored at a third address of local memory portion 502. The first 2 bits of each of the 4-bit data entries have values of "00" and cannot be distinguished from each other. Therefore, if the values of the first 2 bits of the un-hashed data entries were used to identify the 3 entries, the entries will be identified as the same data types (i.e., 00 data types) and incorrectly assigned to the same counter bin despite having different 4-bit values. However, when a hash function (not shown) is applied to the 3 data entries, the resulting example hashed values are 1101, 0110 and 1101, as shown in the second column of FIG. 5A. The first 2 bits of the example hashed values, shown in the third column of FIG. 5A, are then used as the set of bits for the counting sort.

Therefore, although there is a collision between the first and third data entries (i.e., the hashed set of bits are both "11"), the number of collisions are reduced from the pre-hashed values because the first 2 bits of the second data entry is "01" is distinguishable from the first and third data entries as opposed to each of the 3 entries having the same values.

Referring back to FIG. 4, the data entries (i.e., Data Entry A, Data Entry B and Data Entry C) are counted at block 412 and sorted at block 414 (i.e., count sorted). An example of the counting sort of the data entries in FIG. 5A is now described with reference to FIG. 5B and FIG. 5C.

Because 2 bits (i.e., the hashed bits) are used as the set of bits for counting in this example, there are four possible different data types (i.e., "00" "01" "10" and "11"). These data types are shown in the first column of FIG. 5B. As shown in the second column of FIG. 5B, there are no counts (occurrences) for data type "00" corresponding to Data Entry A, 1 count for data type "01" corresponding to Data Entry B, no counts for data type "10" (which does not correspond to any of the 3 data entries in this example) and 2 counts for data type "11" corresponding to Data Entry C.

The data entries are then sorted (i.e., partially sorted) and stored (e.g., using indices to add offsets to the base address) in the memory portion 506, as shown in FIG. 5C, using a parallel prefix sum and based on the counts of the data types shown in FIG. 5B. An example parallel prefix sum (i.e., 0 0 0 3) is shown in FIG. 5B, which results in ENTRY B stored at base address 0x0, ENTRY A stored at offset address 0x1 and ENTRY C stored at offset address 0x2. The parallel prefix sum shown in FIG. 4B is merely an example. The parallel prefix sum shown in FIG. 5B is merely an example of a sorting algorithm used to implement the counting sort according to features of the present disclosure. The counting sort can be implemented using other known sorting algorithms for sorting a collection of data values.

The sorted data entries shown in FIG. 5 C are then executed, at block 416. on the SIMD unit 138 of CU 132. Accordingly, by executing the counting sort using the existing hardware along the memory path (e.g., memory local to the CPU 132), the counting sort is executed more efficiently (e.g., less time and power consumption) than executing the counting sort in software (e.g., executing the counting sort via programmed instructions executing on the shader core).

In one example, the process at blocks 404 and 406 and the process at blocks 408 and 410 are implemented in software and hardware (e.g., vector units execute programmed instructions on a shader core of the compute unit 132) while the counting and sorting at blocks 412 and 414 are implemented in hardware (e.g., register files 302, L0 cache memory 304 and LDS memory 306 as described above) without executing any programmed instructions. That is, the process of determining the set of bits (e.g., active bits) of the data entries and applying the hash function are implemented, for example, by executing programmed instructions on a shader core of the compute unit 132. The modified data is then counted and sorted in hardware (e.g., storing the bits in portions of memory local to the compute unit 132 as described above).

Alternatively, each of the processes (i.e., determining the set of bits, applying the hash function and performing the counting sort) are executed in hardware (e.g., executed using the memory local to the compute unit 132).

When the processes of determining the set of bits and applying the hash function to the data entries are implemented in software, the implementation is more flexible in that the set of bits (e.g., a set number of active bits) and hash function is determined for a particular use case, such as a particular type of application or operations (e.g., ray tracing) to be executed. In addition, multiple different hash functions can be used. However, the modified data (i.e., data entries with the reduced set of bits or hashed data entries), produced by executing the programmed instructions on the shader core, are provided for the counting sort as auxiliary data to be executed using the hardware (i.e., register files 302, L0 cache memory 304 and LDS memory 306), which consumes additional time and power.

When the processes of determining the set of bits and applying the hash function to the data entries are also implemented in hardware, the set of bits used to identify the data entries and the hash function to be applied is fixed in hardware. However, no auxiliary data is processed, which consumes less time during the counting sort than when auxiliary data is processed.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of processing non-coherent data, the method comprising:
   identifying, for data entries each comprising a plurality of bits, a number of occurrences of different types of the data entries by storing the number of occurrences in memory local to a compute unit, wherein the storing includes selectively compressing the data entries based on a number of the plurality of the bits;
   sorting the data entries based on the number of occurrences stored in the memory local to the compute unit to form sorted data entries; and
   executing the sorted data entries by the compute unit.

2. The method of claim 1, wherein the memory local to the compute unit is at least one of local data share (LDS) memory, a cache local to the compute unit or register files.

3. The method of claim 1, wherein the data entries are compressed to a reduced number of bits in response to the number of the plurality of the bits being greater than a number of counting bins.

4. The method of claim 3, wherein the reduced number of bits are active bits whose values change across the data entries.

5. The method of claim 3, further comprising:
   applying a hash function to the reduced number of bits in response to the reduced number of bits being greater than the number of counting bins.

6. The method of claim 3, further comprising:
   in response to the number of the plurality of bits being to be equal to or less than the number of counting bins:
   applying a hashing function to the data entries in response to a number of different data entries having a same bit values is equal to or greater than a threshold number.

7. The method of claim 1, wherein the selectively compressing uses a bit mask.

8. The method of claim 1, wherein the selectively compressing the data entries
   is executed via programmed instructions executing on a shader core of the compute unit.

9. An accelerated processing device comprising:
   memory; and
   one or more processors each comprising a plurality of single-instruction-multiple-data (SIMD) units, wherein the one or more processors are collectively configured to:
   identify, for data entries each comprising a plurality of bits, a number of occurrences of different types of the data entries by storing the number of occurrences in one or more portions of the memory, wherein the storing includes selectively compressing the data entries based on a number of the plurality of the bits;
   sort the data entries based on the number of occurrences stored in the one or more portions of the memory to form sorted data entries; and
   execute the sorted data entries.

10. The accelerated processing device of claim 9, wherein the memory is at least one of local data share (LDS) memory, a cache or register files.

11. The accelerated processing device of claim 9, wherein the data entries are compressed to a reduced number of bits in response to the number of the plurality of the bits being greater than a number of counting bins.

12. The accelerated processing device of claim 11, wherein the reduced number of bits are active bits whose values change across the data entries.

13. The accelerated processing device of claim 11, wherein the one or more processors are collectively configured to:
   apply a hash function to the reduced number of bits in response to the reduced number of bits being greater than the number of counting bins.

14. The accelerated processing device of claim 11, wherein the one or more processors are collectively configured to:
   apply a hashing function the data entries in response to a number of different data entries having a same bit values is equal to or greater than a threshold number.

15. The accelerated processing device of claim 11, wherein the selectively compressing uses using a bit mask.

16. The accelerated processing device of claim 9, wherein the selectively compressing the data entries is performed
   by executing programmed instructions executing on a shader core of the processor.

17. The accelerated processing device of claim 9, further comprising a display device, configured to display pixel output from the accelerated processing device.

18. A processing device comprising:
   memory; and
   an accelerated processing device comprising a plurality of processors, each having plurality of single-instruction-multiple-data (SIMD) units, each respective processor configured to:
   identify, for data entries each comprising a plurality of bits, a number of occurrences of different types of the data entries by storing the number of occurrences in one or more portions of the memory local to the respective processor, wherein the storing includes selectively compressing the data entries based on a number of the plurality of the bits;

sort the data entries to form sorted data entries based on the number of occurrences stored in the one or more portions of the memory local to the respective processor; and
execute the sorted data entries.

* * * * *